US005245910A

United States Patent [19]

Drittel

[11] Patent Number: 5,245,910

[45] Date of Patent: Sep. 21, 1993

[54] RODLESS CYLINDER

[75] Inventor: Volker Drittel, Renningen, Fed. Rep. of Germany

[73] Assignee: Hygrama AG, Rotkreuz, Switzerland

[21] Appl. No.: 852,653

[22] Filed: Mar. 17, 1992

[30] Foreign Application Priority Data

May 29, 1991 [EP] European Pat. Off. ........ 91108772.4

[51] Int. Cl.[5] ........ F16J 1/14; F01B 1/02

[52] U.S. Cl. ........ 92/88; 277/DIG. 7

[58] Field of Search ........ 92/88; 277/DIG. 7

[56] References Cited

U.S. PATENT DOCUMENTS

| | | | |
|---|---|---|---|
| 3,722,374 | 3/1973 | Densmore | 277/DIG. 7 X |
| 4,373,427 | 2/1983 | Garlapaty et al. | 277/DIG. 7 X |
| 4,519,297 | 5/1985 | Lipinski | 92/88 |
| 4,829,881 | 5/1989 | Taki et al. | 277/DIG. 7 X |
| 4,891,908 | 1/1990 | Aquilina | 92/88 X |
| 4,991,494 | 2/1991 | Migliori | 277/DIG. 7 X |

FOREIGN PATENT DOCUMENTS

| | | |
|---|---|---|
| 8511577 | 5/1985 | Fed. Rep. of Germany . |
| 3520419 | 11/1986 | Fed. Rep. of Germany . |

*Primary Examiner*—Edward K. Look
*Assistant Examiner*—Hoang Nguyen
*Attorney, Agent, or Firm*—Michael, Best & Friedrich

[57] ABSTRACT

A linear drive apparatus comprises a cylindrical casing having a longitudinal slot. A piston is located in an inner chamber of the apparatus and can be moved in longitudinal direction by differential pressures. This piston includes a projection extending through the longitudinal slot. The outer side and the inner side of the longitudinal slot are sealed off by a sealing strip. An air connector is in communication with the space between the two sealing strips, allowing the production of a vaccum or of an overpressure in the mentioned space.

11 Claims, 1 Drawing Sheet

RODLESS CYLINDER

BACKGROUND OF THE INVENTION

1. Field of the Invention

The invention relates to a linear drive apparatus including a cylindrical casing having a longitudinal slot, a driving unit arranged for a reciprocating movement in an inner chamber of the cylindrical casing and having a projection projecting through the slot, which slot is sealed off at least at its outer side by an outer sealing strip extending over the length of the casing, which sealing strip is lifted off the longitudinal slot at the location of the projection and is led through a bracket mounted to the projection.

2. Description of the Prior Art

Linear drive apparatuses of the design set forth above are generally known. The driving unit located inside of the cylindrical casing of a known design of such a linear drive apparatus is a piston, which at its face end is sealed against the inner space. The longitudinal slot is also sealed at its inner side by a sealing strip. The moving of the piston is produced by pressure differentials at the two face end sides of the piston.

A further design of a linear drive apparatus is known in which a helical spindle is located inside of the casing, which moves upon a rotating an element having a thread in the longitudinal direction.

When the driving unit moves, a small amount of abrasion is produced. In spite of the outer sealing strip it is possible that abraded matter enters into the surroundings of the area at which this sealing strip is lifted off the edges of the longitudinal slot. For normal operations this occurrence is not disturbing. When the piston is driven by pressurized air, this pressurized air contains also small contaminations which can also reach the surroundings. On the other hand, it is also possible that specifically at the area, where the sealing strip lifts off, contaminations can move from the surroundings of the linear drive apparatus into its inner space. Such contaminations can be for instance dust or particle-like matter. When the linear drive apparatus is to be operated in a surrounding in which solvents are used, it is also possible that such solvents enter the inner area of the cylindrical casing and negatively influence or even destroy lubricating matter used for decreasing friction. The positions can also lead to a getting worse of the sealing property of the sealing strip.

SUMMARY OF THE INVENTION

Therefore, it is a general object of the present invention to provide a linear drive apparatus of which the range of application is increased in such a manner that it can be operated in clean rooms and also in rooms having aggressive surroundings.

A further object is to provide a linear drive apparatus which comprises at least one air connector leading into the space inside of the outer sealing strip and adapted to be connected to a means for producing and maintaining a pressure which differs from the pressure prevailing outside of the cylindrical casing.

This linear drive apparatus provided by the invention can now be used in extremely clean rooms and in rooms having aggressive surroundings, as well. When being used in clean rooms, the provision of a pressure that is lower than the pressure prevailing in this clean room prevents reliably that abrasions or contaminations of the pressurized air used for the driving of the driving unit can exit the cylindrical casing in an uncontrolled manner and enter this clean room. Due to the vaccum these contaminations are drawn off.

If, on the other hand, the apparatus is operated in a room having aggressive environments, the air connector allows to generate and maintain a more or less high overpressure, that is accordingly a pressure which exceeds the pressure prevailing outside of the cylinder. By means of this procedure, it is prevented that dust or vapours reach the inner space of the cylindrical casing. In rooms having aggressive surroundings, the small amount of contaminating matter stemming from the inner space of the cylindrical casing produces no disturbance.

In this manner the linear drive apparatus modified by simple means in such a manner that its range of application is increased.

A further object of the invention is to provide a linear drive apparatus in which the air connector is located in the area of the end of the cylindrical casing, specifically preferably at the area of the longitudinal slot. By such a design,the designs for the linear drive apparatuses must be hardly changed.

Still a further object is to provide a linear drive apparatus which comprises two air connectors which are arranged specifically at the area of the ends of the cylindrical casing.

A yet further object is to provide a linear drive apparatus in which the cylindrical casing includes a longitudinal slot which is sealed by an inner sealing strip, which for instance is led through the inside of the piston, in which the air connector communicates with the space between the two sealing strips. Accordingly, no hindrance of the operation of the earlier linear drive apparatuses is suffered. The general object of the invention is safely reached when a vacuum is applied and also when an overpressure is applied.

BRIEF DESCRIPTION OF THE DRAWING

The invention will be better understood and objects other than those set forth above will become apparent when consideration is given to the following detailed description thereof. Such description makes reference to the annexed drawings, wherein.

DETAILED DESCRIPTION OF THE PREFERRED EMBODIMENTS

Figure 1:
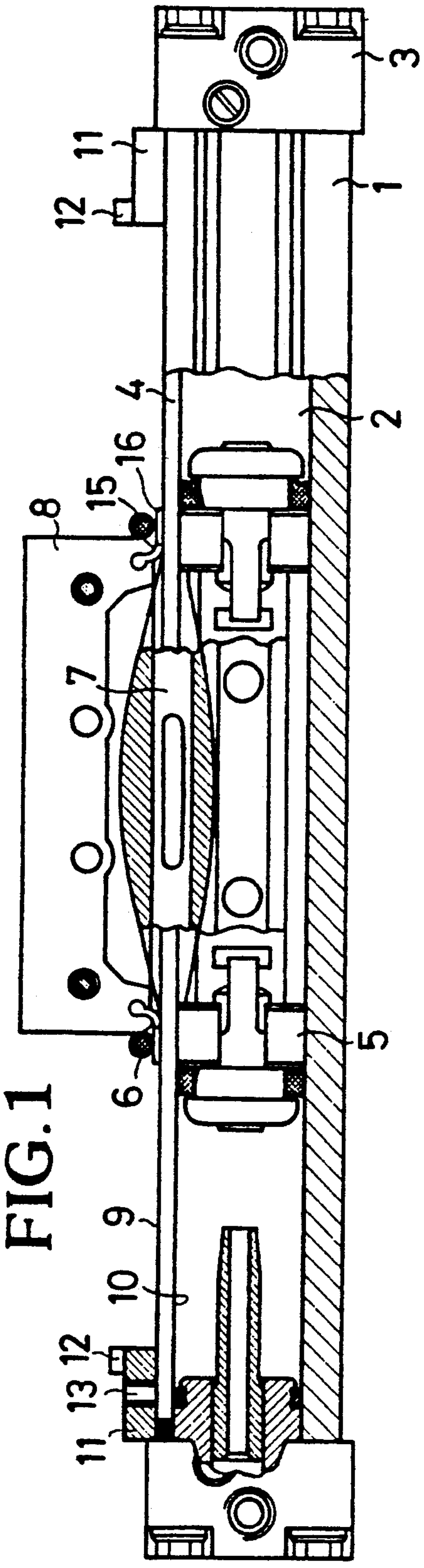
FIG. 1 is a longitudinal section through a linear drive apparatus structured in accordance with the invention.

The linear drive apparatus illustrated in FIG. 1 includes a cylindrical casing 1, which contains an inner chamber 2 having the form of a circular cylinder, which inner chamber 2 is arranged slightly excentrically offset relative to the cylindrical casing 1. Both face end sides of the casing 1 are closed off by a respective head piece 3.

The cylindrical casing 1 includes a longitudinal slot 4 which extends over the entire length of the cylindrical casing 1.

A drive unit designed as a piston 5 is located in the inner chamber 2 for a longitudinal movement therein. At the area of these two face end sides, the piston 5 is sealed against the inner chamber 2 by a respective annular seal 6.

A lateral projection 7 is mounted to the piston 5 roughly at the centre of its longitudinal extent, which projection 7 extends through the longitudinal slot 4 towards the outside. A bracket 8 is mounted to the outer side of the projection 7 such that the movement of the piston 5 can be taken off at that location.

The longitudinal slot 4 is sealed at its outer side by an outer sealing strip 9. At its inner side the longitudinal slot 4 is sealed by an inner sealing strip 10. Both sealing strips 9, 10 extend in the longitudinal direction of the linear drive apparatus and obviously are of a width that is larger than the width of the longitudinal slot 4. Because the sealing strips 9, 10 are broader than the longitudinal slot 4 and the projection 7 is narrower than the longitudinal slot 4, the two sealing strips 9, 10 are lifted off the longitudinal slot 4 at the area of the projection 7 and led towards the outside and towards the inside, respectively, and led through the bracket 8 and the piston 5, respectively. The area, in which the two sealing strips are lifted off from the longitudinal slot 4, moves together with the movement of the piston 5. In the illustrated example, the piston 5 is moved by pressurized air which is fed into the head pieces 3 through corresponding connecting parts. The up to now described design of a linear drive apparatus is generally known. The sealing strips consist for instance of steel and are pressed onto the edges of the longitudinal slot by means of magnets.

The outer sealing strip 9 is clamped at the area of both its ends by means of a screwed on block 11. This block 11 is screwed on by means of two threaded bolts 12 to the casing 1, including an intervening seal. The block 11 comprises a threaded hole 13, to which a nipple for a pressurized air line can be mounted. The hole 13 leads into the space between the two sealing strips 9, 10 because the sealing strip 9 ends in the longitudinal direction of the casing ahead of the threaded hole 13.

The opposite end of the linear drive apparatus comprises also such a block 11 having a connection for the feeding of air.

Figure 2:
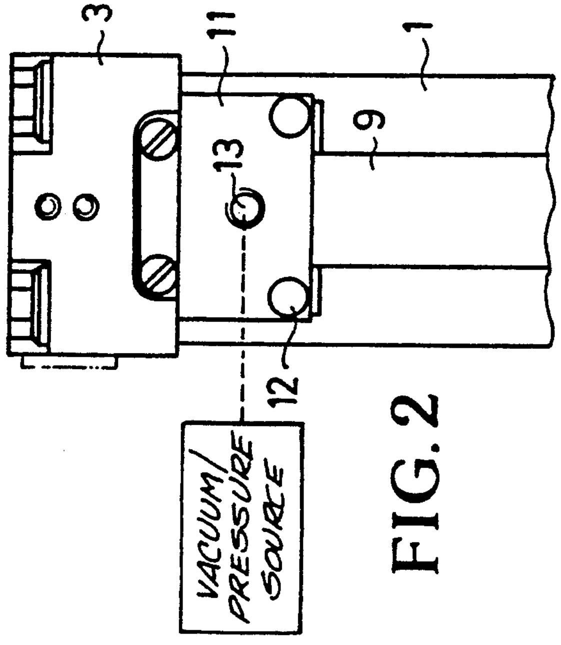
FIG. 2 is a top view of one end of the linear drive apparatus, designed on a somewhat enlarged scale.

FIG. 2 illustrates a top view of the end of the linear drive apparatus on an enlarged scale. The block 11 is located directly adjacent the head piece 3 and is bolted to the casing 1 by means of threaded bolts 12. It thereby clamps the end of the outer sealing strip 9.

Figure 3:
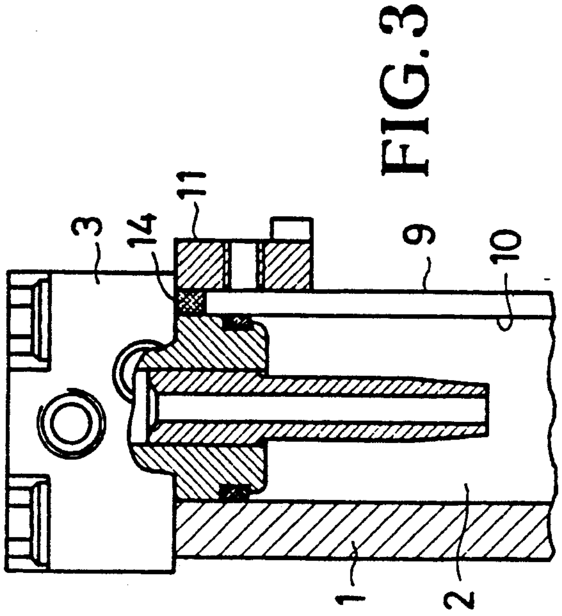
FIG. 3 is a partial section through the end of the linear drive apparatus of FIG. 1, designed on a somewhat enlarged scale.

The same arrangement is also illustrated in FIG. 3. Additionally, the figure illustrates that a further seal 14 is inserted between the inner sealing strip and the end of the block 11 closer to the head piece 3.

If the linear drive apparatus structured in accordance with the invention is to be used in a super clean room, the hole 13 is connected to a source of a vaccum which acts accordingly between the outer and the inner sealing strip 10, that is a pressure is present that is lower than the pressure prevailing in the clean room. The magnitude of the vaccum depends from the prevailing situation of the respective individual cases. When during the movement of the piston the pressurized air contains certain contaminants which reach the space between the two sealing strips, these contaminants are drawn off such that they cannot reach the surroundings of the apparatus. Also an abrasion, which could be produced because the lip 16 slides on the bracket 8, will be drawn off by the vacuum applied. This is specifically true when the lip 16, which is acted upon by an annular sealing ring 15, is correspondingly designed.

If, however, the linear drive apparatus structured in accordance with the present invention is to be used in aggressive surroundings, a slight overpressure is produced in the interstice between the two sealing strips 9, 10 acting thereupon in that a corresponding connection to a source of pressurized air is made, whereby the pressure is also selected in accordance with the prevailing conditions. This overpressure blocks those areas at which an entry of dust, abrasion products or vapours would be possible. It, therefore, prevents that mentioned matters can enter the inside of the linear drive apparatus.

While there are shown and described present preferred embodiments of the invention, it is to be distinctly understood that the invention is not limited thereto, but may be otherwise variously embodied and practiced within the scope of the following claims.

I claim:

1. A linear drive apparatus comprising a cylindrical casing having a longitudinal slot, a driving unit arranged for a reciprocating movement in an inner chamber of the cylindrical casing and having a projection projecting through the slot, which slot is sealed off at least at its outer side by an outer sealing strip extending over the length of the casing, which sealing strip is lifted off the longitudinal slot at the location of the projection and is led through a bracket mounted to the projection, an inner sealing strip sealing said slot, and at least one air connector leading into the space between the outer sealing strip and the inner sealing strip and adapted to be connected to a means for producing and maintaining in said space a pressure which differs from the pressure prevailing outside of the cylindrical casing.

2. The linear drive apparatus of claim 1, in which the air connector is located in the area of the end of the cylindrical casing.

3. The linear drive apparatus of claim 1, comprising two air connectors communicating with said space.

4. The linear drive apparatus of claim 1, in which the air connector is located in the area of the longitudinal slot.

5. The linear drive apparatus of claim 1, in which for an application thereof in a clean chamber the air connector is adapted to communicate with a vacuum source.

6. The linear drive apparatus of claim 1, in which for an application thereof in an aggressive environment the air connector is adapted to communicate with an overpressure source.

7. The linear drive apparatus of claim 1 and further comprising means for applying and maintaining a vacuum at the area inside of the outer sealing strip.

8. The linear drive apparatus of claim 1 and further comprising means for applying and maintaining an overpressure at the area inside of the outer sealing strip.

9. The apparatus of claim 8 and further comprising means for maintaining the pressure when the driving unit is at rest.

10. A method of operating a linear drive apparatus, said method comprising the steps of providing a linear drive apparatus comprising a cylindrical casing having a longitudinal slot, a driving unit arranged for a reciprocating movement in an inner chamber of the cylindrical casing and having a projection projecting through the slot, which slot is sealed off at least at its outer side by an outer sealing strip extending over the length of the casing, which sealing strip is lifted off the longitudinal slot at the location of the projection and is led through a bracket mounted to the projection, an inner sealing strip sealing said slot, and at least one air connector leading into the space between the outer sealing strip and the inner sealing strip, and connecting said air connector to a means for producing and maintaining a vacuum in said space.

11. A method of operating a linear drive apparatus, said method comprising the steps of providing a linear drive apparatus comprising a cylindrical casing having a longitudinal slot, a driving unit arranged for a reciprocating movement in an inner chamber of the cylindrical casing and having a projection projecting through the slot, which slot is sealed off at least at its outer side by an outer sealing strip extending over the length of the casing, which sealing strip is lifted off the longitudinal slot at the location of the projection and is led through a bracket mounted to the projection, an inner sealing strip sealing said slot, and at least one air connector leading into the space between the outer sealing strip and the inner sealing strip, and connecting said air connector to a means for producing and maintaining in said space a pressure greater than the pressure prevailing outside of the cylindrical casing.

* * * * *